United States Patent [19]
Stich

[11] 3,760,392
[45] Sept. 18, 1973

[54] CAPACITIVE POSITION SENSOR

[75] Inventor: Frederick A. Stich, Hales Corners, Wis.

[73] Assignee: Allis-Chalmers Corporation, Milwaukee, Wis.

[22] Filed: May 15, 1972

[21] Appl. No.: 253,418

[52] U.S. Cl................. 340/200, 318/138, 318/254, 317/249, 323/93
[51] Int. Cl. ............................................ H02p 1/00
[58] Field of Search..................... 340/200; 318/254; 317/249; 323/93

[56] References Cited
UNITED STATES PATENTS

| | | |
|---|---|---|
| 2,980,839 | 4/1961 | Haessermann...................... 318/138 |
| 3,214,663 | 10/1965 | Kreutzer............................. 318/254 |
| 3,346,792 | 10/1967 | Noumi............................... 318/138 |

Primary Examiner—John W. Caldwell
Assistant Examiner—Robert J. Mooney
Attorney—Lee H. Kaiser et al.

[57] ABSTRACT

A capacitive rotor position sensor generates three phase output pulses indicative of the position of the rotor of a three phase commutatorless D.C. motor. A radially elongated capacitor plate connected to the motor rotor is rotatably mounted adjacent 12 circumferentially displaced stationary capacitor plates, and a high frequency oscillator is coupled to the rotatable plate. A differential amplifier for each phase has one input coupled to three adjacent first stationary capacitor plates which together subtend 180 electrical degrees and the other input coupled to three adjacent second stationary capacitor plates which together subtend 180 electrical degrees and are displaced 180 electrical degrees from the first plates, and the corresponding inputs of the three differential amplifiers are coupled to first stationary plates displaced 120 electrical degrees apart and to second stationary plates displaced 120 electrical degrees apart. The high frequency pulses from the oscillator are coupled through the rotatable plate to the stationary plates, and the differential amplifiers enhance the one-to-zero ratio of (1) a logic one signal from a stationary plate opposite the rotatable plate at a given instant; and (2) a logic zero signal from a stationary plate simultaneously displaced 180 electrical degrees from the rotatable plate, to derive square wave output pulses at a frequency proportional to motor speed indicative of the rotor position.

25 Claims, 6 Drawing Figures

CAPACITIVE POSITION SENSOR

This invention relates to commutatorless D.C. motors and in particular to capacitive transducers for detecting the position of the rotor of a commutatorless D.C. motor.

BACKGROUND OF THE INVENTION

Commutation in a conventional D.C. motor is essentially a mechanical switching operation in which brushes and a segmented commutator cyclically reverse currents through the armature conductors in a sequence as a function of rotor position, and such commutation results in friction wear and sparking with the attendant generation of radio frequency noise. In order to eliminate such defects, commutatorless D.C. motors have been developed provided with electronic commutation means for controlling the armature current in accordance with the rotational position of the rotor. Brushless D. C. motors are also known which employ a permanently magnetized rotor and wherein the stator windings are energized in a cyclical sequence through electronic switching means which are sequentially gated in accordance with the rotational position of the rotor.

Some known rotor position sensors modulate a source of radiant energy, while other known rotor position sensors use a Hall element or employ a permanent magnet in the periphery of the rotor to induce an e.m.f. in a control winding. Such prior art rotor position detectors, in general, have low sensitivity and relatively high temperature drift, and such factors require that the associated circuitry be excessively complicated and expensive in order to obtain the desired accuracy, reliability and low maintenance. Capacitive rotor position sensors have also been employed with brushless D.C. motors in an effort to reduce expense and to minimize maintenance, but the accuracy of known capacitive transducers for measuring angular position is limited by capacitive fringing effects and is dependent upon rotor velocity.

OBJECTS OF THE INVENTION

It is an object of the invention to provide an improved capacitive position sensor for indicating the position of a rotatable member.

It is another object of the invention to provide an improved capacitive rotor position detector for controlling the commutation switching of a commutatorless D.C. motor.

Another object of the invention is to provide an improved capacitive rotor position sensor which is inexpensive yet highly accurate and reliable.

A further object of the invention is to provide such a capacitive rotor position detector for the electronic commutation of a D.C. motor which is not velocity dependent and provides an accurate indication of rotor position even at stall.

A still further object of the invention is to provide a capacitive rotor position sensor which has high sensitivity and low temperature drift and provides a polyphase pulse output at a frequency proportional to motor speed adapted to control electronic switches for energizing the stator windings of a polyphase electric motor in a direction and cyclical sequence which will maintain the rotor field locked in with the rotating stator field of the motor.

DESCRIPTION OF THE DRAWINGS

These and other objects and advantages of the invention will be more readily apparent from the following detailed description when considered in conjunction with the accompanying drawing wherein.

SUMMARY OF THE INVENTION

A capacitive position sensor in accordance with the invention generates output pulses indicative of the position of a rotatable member and has a radially elongated capacitor plate operatively connected to the rotatable member and rotatably mounted adjacent a plurality of circumferentially displaced stationary capacitor plates. A high frequency oscillator is coupled to the rotatable plate, and means coupled to the stationary capacitor plates and responsive to the pulses from the oscillator flowing through the capacitance between rotatable and stationary plates generate an output pulse when the rotatable plate is opposite each stationary plate.

The preferred embodiment indicates the position of the rotor of a motor having $n$ phases and $p$ rotor pole pairs. $2pn$ stationary capacitor plates are circumferentially displaced apart in a plane opposite a rotatable capacitor plate having one radial arm for each rotor pole pair. A differential amplifier for each phase has one input coupled to a plurality of adjacent first stationary capacitor plates which together subtend 180 electrical degrees to generate a phase output signal and its other input coupled to a plurality of adjacent second stationary plates which together subtend 180 electrical degrees and are displaced 180 electrical degrees from the first stationary plates to generate the complement of the phase output signal. The corresponding stationary plates coupled to the $n$ stationary amplifiers are displaced $360/n$ electrical degrees so that the output is an $n$-phase train of pulses having a frequency proportional to the angular velocity of the motor rotor. The differential amplifiers enhance the one-to-zero ratio of: (1) a logic one voltage signal from a stationary plate which the rotatable plate is opposite at a given instant; and (2) a logic zero voltage signal from a stationary plate simultaneously displaced 180° electrical from the rotatable plate. Bistable circuit means provide positive feedback to the inputs of the differential amplifiers to enhance discrimination between stationary capacitor plates.

DETAILED DESCRIPTION

Figure 5A:
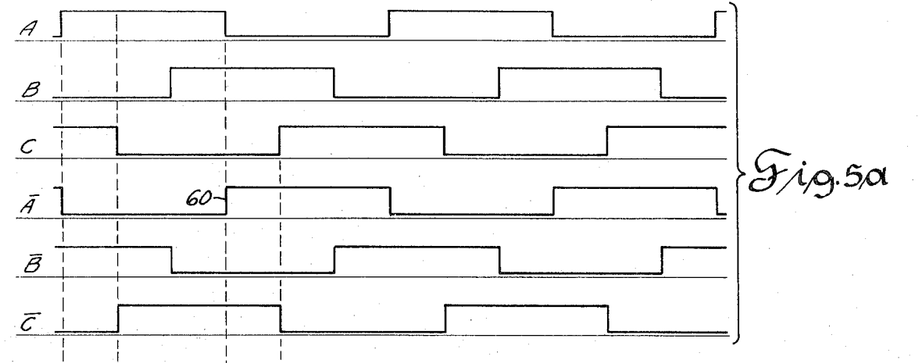
FIGS. 5a and 5b respectively illustrate: (a) the three-phase square wave output from the capacitive position transducer of FIG. 1; and (b) the train of pulses from the synchronous pulse generator whose frequency is a function of motor speed.

Referring to the drawing, the capacitive rotor position sensor 11 of the preferred embodiment shown in FIGS. 1–4 determines the instantaneous position of a commutatorless motor rotor R and provides a three-phase square wave output A, Ā, B, B̄, C and C̄ shown in FIG. 5a at a frequency proportional to motor speed and which is indicative of rotor position and thus of the position of the rotor field with respect to the motor stator windings (not shown). The three-phase position sensor output establishes the correct stator field sequence with respect to the rotor R so that the power transistors or SCR's which energize the stator windings conduct at the right time and in the proper sequence to maintain the desired direction and rotational velocity of the stator rotating field.

Capacitive rotor position sensor 11 is particularly adapted for use in a motor control system disclosed in the copending U.S. patent application of Frederick A. Stich and Allois F. Geiersbach, S.N. 266,286 entitled "Control For Commutatorless Motor" filed June 26, 1972, and to control the power transistors which energize the stator windings of a commutatorless D.C. motor disclosed in the copending U.S. Patent application of Frederick A. Stich and Glenn W. Schwantes, S.N. 278,577 entitled "Commutatorless Motor" filed August 7, 1972 both of which have the same assignee as this invention.

The motor rotor has $p$ pole pairs, where $p$ is an integer, and the capacitor rotor position sensor has at least $p$ times $n$ arcuately displaced stationary capacitor plates, where $n$ is an integer equal to the number of motor phases. Motor rotor R of the preferred embodiment shown in FIGS. 1–4 has $2p$ pole pairs, i.e., four poles, and capacitive rotor position sensor 11 of the preferred embodiment may have $2pn$ equals 12 circumferentially displaced metallic capacitor plates, or electrodes 31 in a common plane perpendicular to the motor rotor axis and defining an annular disk. The stationary electrodes 31 may be copper plates in the shape of a sector of a ring subtending an arc of $360/2n$ equals 60 electrical degrees and affixed to a stationary annular stator board 40 (See FIGS. 2 and 3) mounted by fastening means 41 to the end bell 42 of the brushless motor frame S. Stationary stator board 40 may be of an insulating material such as fibre glass impregnated with epoxy resin.

Figure 1:
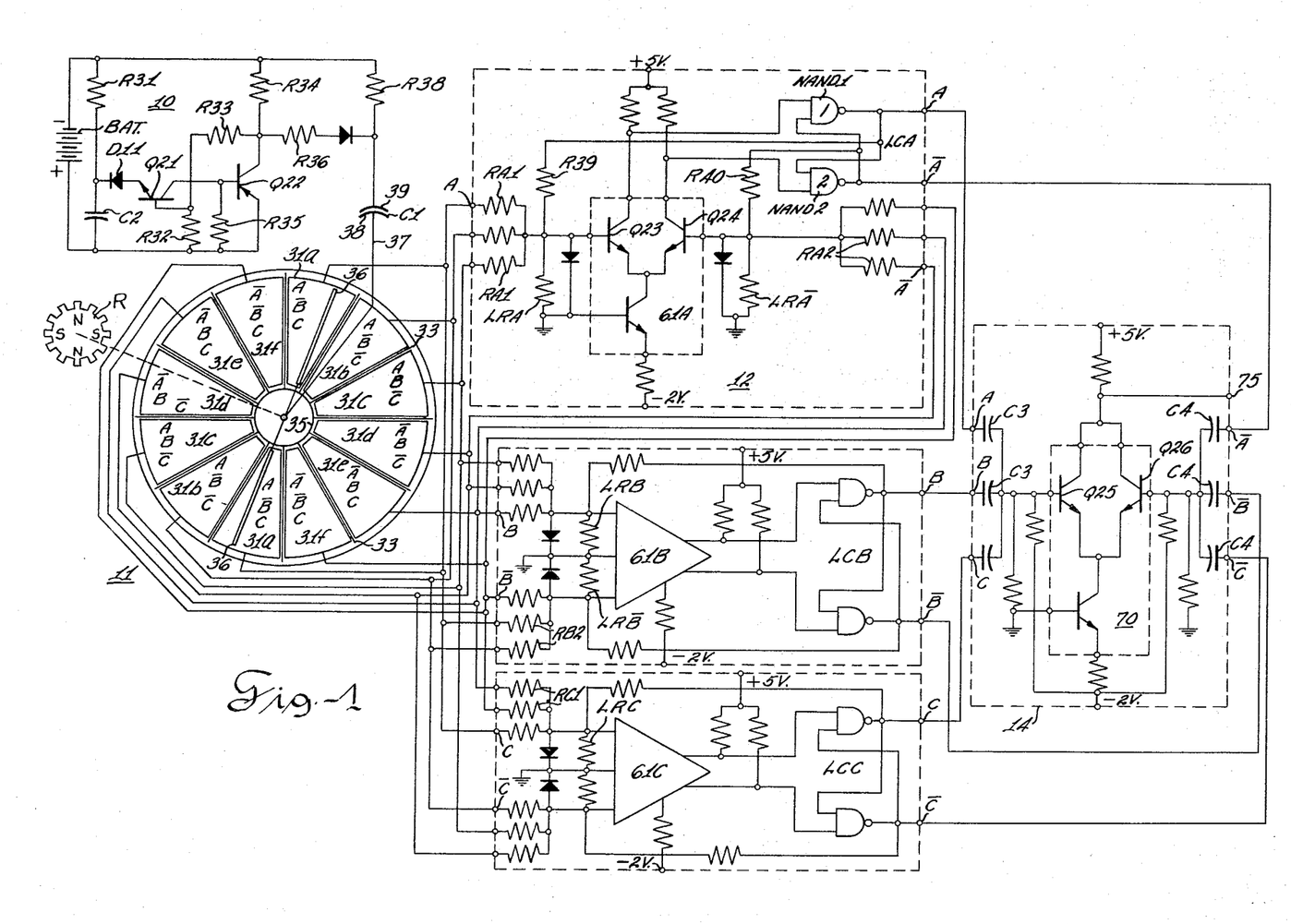
FIG. 1 is a schematic circuit diagram of a capacitive rotor position sensor embodying the invention.
Figure 2:
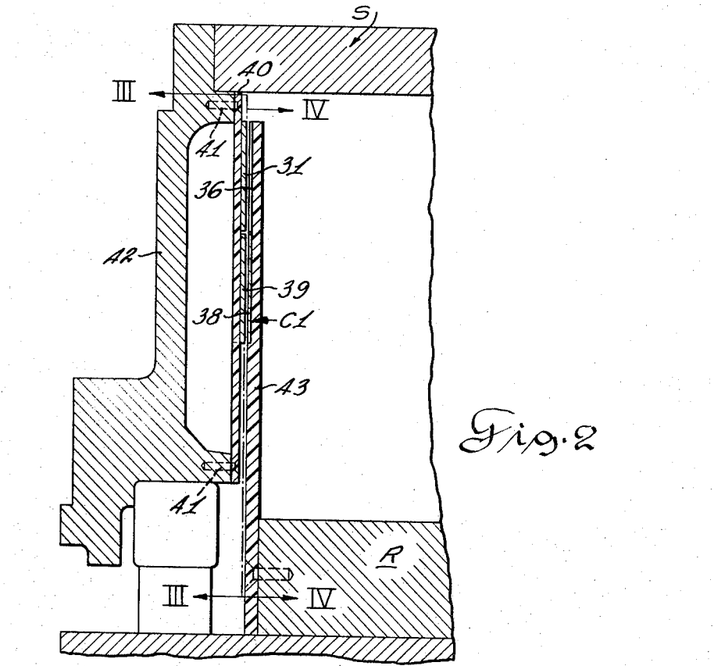
FIG. 2 is a partial cross sectional view through the rotor position sensor of FIG. 1.
Figure 3:
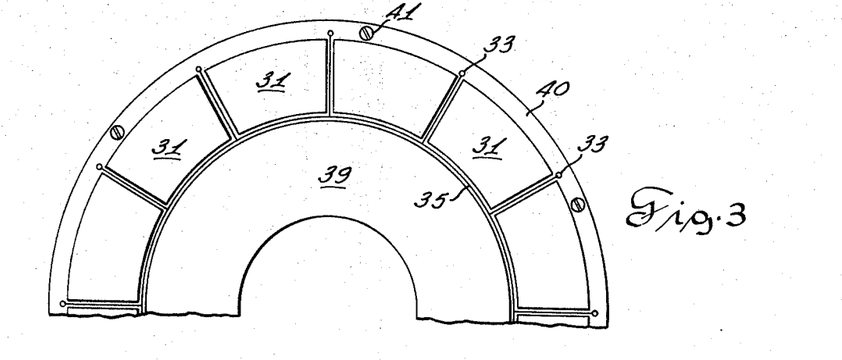
FIGS. 3 and 4 are views taken along lines III and IV respectively of FIG. 2.
Figure 4:
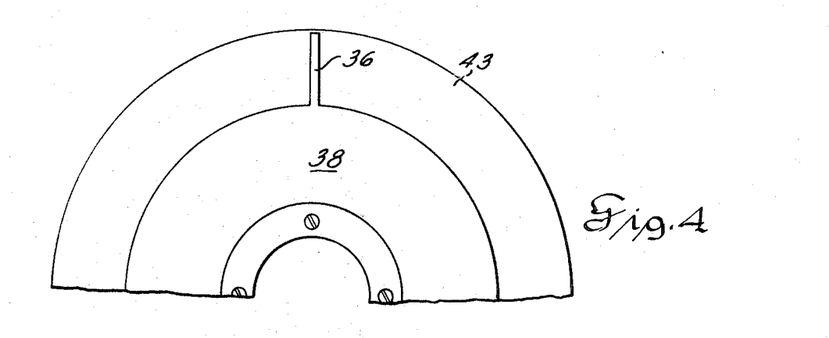

The capacitive rotor position sensor of the invention has a radially extending rotatable capacitor plate for each pole pair with the radially extending arms displaced 360 electrical degrees. In the preferred embodiment having two rotor pole pairs, a diametrically elongated, rotatable capacitor plate 35 operatively connected to the motor rotor R for rotation therewith and mounted for rotation adjacent stationary capacitor plates 31 comprises two electrically commoned, elongated and narrow radially extending electrodes 36 aligned along a diameter. The two electrodes 36 which constitute rotatable capacitor plate 35 are schematically shown in FIG. 1 as electrically commoned and connected by a conductor 37 to a movable electrode 38 of a coupling capacitor C1 having its stationary electrode 39 coupled to the output of a relaxation oscillator 10 which is capable of generating fast-rise, or steep wavefront pulses.

Stationary electrode 39 of coupling capacitor C1 may be a thin annular copper ring 39 (See FIGS. 2 and 3) affixed to stationary stator board 40 radially inward from the stationary capacitor plates 31. Movable electrode 38 of coupling capacitor C1 may be a thin annular copper member affixed to a rotating annular rotor board 43 which is fastened to the motor rotor R and preferably is of an insulating material such as fiber glass impregnated with epoxy resin. Movable electrode 38 of coupling capacitor C1 so affixed to rotatable rotor board 43 may be spaced by an air gap from stationary electrode 39 fastened to stationary rotor board 40. Movable electrode 38 of coupling capacitor C1 may have thin, diametrically opposed fingers 36 integral therewith extending radially outward which constitute the two radially elongated electrodes 36 that define rotatable capacitive plate 35. Radial conductors 33 electrically connected to ground are disposed between adjacent stationary capacitor plates 31, and a grounding conductor ring 35 may be disposed between the outer periphery of the stationary electrode 39 of coupling capacitor C1 and the inner margin of the stationary electrodes 31 for the purpose of electrically isolating the stationary plates 31 from each other so that discrimination between the plates is high.

RELAXATION OSCILLATOR

Relaxation oscillator 10 may include a capacitor C2 charged from the battery BAT through a resistance R31 and coupled through a diode D11 to the emitter of a transistor Q21. The potential on the base of transistor Q21 is established by a voltage divider comprising three resistors R32, R33, and R34 connected in series across the battery terminals. When the voltage on capacitor C2 rises to a predetermined potential, the emitter of transistor Q21 becomes forward biased, and transistor Q21 turns on and discharges capacitor C2 through its collector resistor R35 to the positive terminal of the battery, thereby applying the voltage drop across resistor R35 to the base of a transistor Q22 and turning it on. Conduction by transistor Q22 lowers the voltage on its collector and generates an output pulse which is coupled through a resistor R36, a diode D12, and the fixed and rotating plates 39, 38, of coupling capacitor C1 to the rotatable capacitor plate 35 of capacitive position sensor 11. Such charging of capacitor C2 and discharging thereof through transistor Q21 and resistor R35 is repeated rapidly to generate output pulses from relaxation oscillator 10 at a high frequency.

In order to obtain high accuracy, oscillator 10 has a frequency which is high relative to the electrical frequency that is synchronous to the motor, for example, 20 KHZ for a 5,000 RPM, 4-pole motor. The high frequency pulses generated by relaxation oscillator 10 are coupled through rotatable capacitor electrode 35 to the stationary capacitor plates 31 and the load connected thereto. Oscillator 10 thus derives "read-out" pulses with high frequency components which are distributed by rotatable capacitor plate 35 to a square wave generator 12 through the fixed capacitor plates 31 arranged in the sequence shown in FIG. 1. The high frequency components of the read-out pulses readily couple through adjacent rotatable and fixed capacitor plates 35 and 31. The rotatable electrodes 36 (which define rotatable capacitor plate 35) and the fixed plates 31 are preferably elongated in a radial direction to obtain adequate capacitance, but the width of the rotatable electrodes 36 is held to a minimum to obtain high accuracy. Inasmuch as the preferred embodiment is for a four-pole rotor R, a set of output pulses A, $\bar{A}$, B, $\bar{B}$, C and $\bar{C}$ shown in FIG. 5a will be generated during 180° (mechanical) of rotation of rotor R, and consequently, diametrically opposite fixed plates 31 which contain the same information are electrically connected together. The read-out pulses received on the stationary plates 31a–31f are converted by the square wave generator 12 into the three-phase square waves $\overline{A}$, $\overline{B}$, $\overline{C}$ and their complements A, B, C shown in FIG. 5a at a frequency proportional to motor speed and are indicative of the position of the rotor field relative to the motor stator phase windings (not shown).

The output signals from the stationary plates 31 are developed across load resistors LR, and the output signals from three adjacent plates 31 for each phase are developed across a common load resistor. For example, the outputs from fixed plates 31a, 31b and 31c designated A for phase A are connected through individual coupling resistors RA1 across a common load resistor LRA. The output signal from a stationary plate 31 developed across a load resistor LR when rotatable plate 35 is opposite thereto may be considered a logical one voltage, while the output signal from a stationary plate 31 when rotatable plate 35 is remote therefrom may be considered logical zero voltage. The individual stationary plates 31 subtend an arc of approximately 360/2n equals 60 electrical degrees, and the three adjacent stationary capacitor plates 31a, 31b, 31c for phase A coupled to load resistor LRA together subtend 180 electrical degrees (so that the phase A output pulse is of 180 electrical degrees duration) and are also displaced 360/n equals 120 electrical degrees (60° mechanical) from the three corresponding adjacent stationary plates 31c, 31d, and 31e associated with phase B and also 120 electrical degrees from the three corresponding adjacent stationary capacitor plates 31e, 31f, and 31a associated with phase C.

The output from relaxation oscillator 10 is connected through diode D12 across a 220K resistor R38 to assure that discharge of the stationary capacitor plates 31 is not rapid enough to reset the flip-flops which are employed in some embodiments to convert the logic zero voltage and logic one voltage output signals from the stationary capacitor plates 31 into the three phase square waves shown in FIG. 5a.

SQUARE WAVE GENERATOR

Square wave generator 12 may include three similar differential amplifiers 61A, 61B and 61C each of which is associated with one of the motor phases A, B and C and produces the output for that phase. The differential amplifiers 61A, 61B, and 61C enhance the "one-to-zero" ratio of the inputs thereto from the stationary plates developed across the load resistor LR, and one input to each differential amplifier is a logic one signal from a stationary plate 31 having relatively high coupling at a given instant to rotatable plate 35 and the other input thereto is a logic zero signal from a stationary plate having relatively low coupling at that instant to rotatable capacitor plate 35. The two inputs of each differential amplifier for a given phase are coupled to stationary plates 31 for that phase displaced 180° (electrical) apart so that the two inputs are receiving logic one and logic zero signals from stationary plates 31 having relatively high and relatively low coupling respectively with rotatable capacitor plate 35. For example, the A and $\overline{A}$ inputs to differential amplifier 61A are respectively coupled through resistors RA1 and RA2 to stationary plates 31a and 31d (or plates 31b and 31d, or plates 31c and 31f) designated A when both electrodes 36 are opposite stationary plates 31a and rotatable electrode 35 is displaced 90 mechanical degrees (180° electrical) from stationary plate 31d so that minimum coupling exists between plates 31d and 35.

Each stationary plate 31a, 31b and 31c designated A for phase A subtends 30 mechanical degrees (60° electrical), and the three plates 31a, 31b and 31c are disposed side-by-side so that together they subtend 180° (electrical) and the A output pulse (which is generated when rotatable plate 35 is opposite plates 31a, 31b and 31c designated A) has a period of 180° electrical.

The inputs to the differential amplifier 61A, 61B and 61C for each phase are coupled to stationary plates 31 displaced 120° (electrical) from the stationary plates 31 to which the differential amplifiers for the other two phases are coupled so that the outputs A, B and C are displaced 120° electrical. Stated more broadly, the inputs to the phase differential amplifiers 61 are coupled to stationary capacitor plates displaced 360/n electrical degrees, where n is an integer equal to the number of motor phases. For example, the A input to differential amplifier 61A for phase A is coupled through RA1 resistors to stationary plates 31a, 31b, and 31c, and the B input to differential amplifier 61B for phase B is coupled through RB1 resistors to stationary plates 31c, 31d and 31e designated B which are displaced respectively 120° (electrical) from stationary plates 31a, 31b and 31c designated A. Similarly, the phase B plates 31c, 31d and 31e are displaced 120° (electrical) respectively from the phase C stationary plates 31e, 31f and 31a designated C.

The motor rotor R has four poles, and consequently, each pair of diametrically opposed plates 31 (which are displaced 360 electrical degrees apart and contain the same information) are electrically connected together and thus increase the capacitive coupling between rotatable and stationary plates. For example, the pair of diametrically opposed stationary electrodes 31a are connected together, and the pair of diametrically opposed stationary electrodes 31b are electrically connected together. Each pair of electrically commoned stationary plates 31 is connected to one of the six inputs to each of the three differential amplifiers 61A, 61B and 61C. For example, diametrically opposed and electrically commoned stationary plates 31a designated A, $\overline{B}$, C are connected through a resistor RA1 to an A input of differential amplifier 61A, through a resistor RB2 to a $\overline{B}$ input of differential amplifier 61B, and through a resistor RC1 to a C input of differential amplifier 61C. The designation of the input resistors as A resistors, $\overline{B}$ resistors, C resistors, etc., connotes that the particular input resistor is connected to a pair of diametrically opposed stationary electrodes 31 bearing this designation and which results in the corresponding output pulse being at logic 1 voltage when rotatable electrode 35 is opposite these stationary plates. For example, resistors RA1 are connected to the pairs of stationary electrodes 31a, 31b and 31c each of which is designated A and subtends 60 electrical degrees and which results in the generation of the A pulse during the interval that rotating electrodes 35 has closer capacitive coupling to these stationary capacitor plates than to the stationary electrodes 31d, 31e and 31f designated $\overline{A}$. Similarly, RB2 input resistors are connected to the pairs of stationary capacitor electrodes 31f, 31a and 31b designated $\overline{B}$ and which result in the generation of the $\overline{A}$ square wave during the interval when rotatable electrodes 36 are opposite thereto. The stationary plates 31c, 31d and 31e designated B are respectively displaced 120° (electrical) from the stationary electrode 31a, 31b, and 31c designated A, and since each stationary electrode 31c, 31d and 31e subtends 60° (electrical), pulse B has a period of 3 × 60 = 180° (electrical) and is displaced 120° (electrical) from the A output pulse.

In alternative embodiments, flip-flops (not shown) convert the one and zero outputs from the stationary plates 31 to the set of three-phase square waves A, $\overline{A}$, B, $\overline{B}$, C and $\overline{C}$ shown in FIG. 5a, and preferably such flip-flops use a common emitter resistor so that each flip-flop performs as a positively fed-back difference amplifier during the switching transition to assure that there is positive discrimination between the one and zero inputs.

Square wave generator 12 also preferably includes three NAND gate latch circuits LCA, LCB and LCC each of which is associated with one of the phases and the differential amplifier for that phase. For example, differential amplifier 61A and latch circuit LCA are associated with phase A and together generate the square wave pulse A for phase A and its negation $\overline{A}$ (which is the inverse of A).

The three differential amplifiers 61A, 61B and 61C are similar, and only differential amplifier 61A for phase A will be described. Differential amplifier 61A is of conventional configuration, and the base of one transistor Q23 is coupled to load resistor LRA which is common to the three resistors RA1 which add the signals from the pairs of position sensor stationary plates 31a, 31b, and 31c respectively that are designated A and together subtend 180 electrical degrees. The base of the other transistor Q24 of differential amplifier 61A is coupled to load resistor $\overline{LRA}$ which is common to the three $\overline{A}$ input resistors RA2 which are individually connected to the pairs of stationary plates 31d, 31e, and 31f designated $\overline{A}$ and sum the signals therefrom. The active elements of the differential amplifiers 61A, 61B, and 61C are preferably integrated circuits, and differential amplifier 61B is symbolically shown as being one half of an integrated circuit which is commercially available from RCA Corporation under the type designation CA3026.

Differential amplifier 61A provides a low voltage, or logic 0 output on the collector of that transistor Q23 or Q24 having its base coupled to the three pairs of stationary plates 31a, 31b, 31c or 31d, 31e, 31f, having the greatest coupling to the rotatable electrode 35, thereby giving an indication of the position of the motor rotor R. For example, if rotatable electrodes 36 are in a position where the sum of the readout pulses received on the pairs of plates 31a, 31b, and 31c designated A is greater than the sum of the pulses received on pairs of stationary plates 31d, 31e, and 31f designated $\overline{A}$, transistor Q23 will be turned on and the voltage on its collector will be low and transistor Q24 will be turned off and its collector potential will be relatively high. Inasmuch as each stationary plate 31 subtends 60° (electrical) the A pulse will have a period of 180° (electrical) while rotatable electrode 35 is opposite the A stationary plates 31 a, 31b, and 31c, and similarly, the $\overline{A}$ pulse will have a period of 180° (electrical) while rotatable electrode 35 is opposite the $\overline{A}$ plates 31b, 31e and 31f.

Differential amplifiers 61A, 61B, and 61C enhance the "one-to-zero" ratio of the input from stationary plates 31 and control NAND gate latch circuits LCA, LCB, and LCC respectively which convert the enhanced pulses into the square waves A, $\overline{A}$, B, $\overline{B}$, C and $\overline{C}$. The collector of transistor Q23 is coupled to one input of a NAND gate NAND 1, and the collector of transistor Q24 is coupled to one input of a NAND gate NAND2. The output from gate NAND1 is coupled to the other input of gate NAND2 and provides positive feedback to the base of transistor Q23 through a resistor R39. Similarly, the output from gate NAND2 is coupled to the other input of gate NAND1 and provides positive feedback through a resistor R40 to the base of transistor Q24.

Assume the condition where the potential at the collector of transistor Q24 is high and that of transistor Q23 is low. The logic 0 voltage on said one input of gate NAND1 will provide logic 1 on its output to generate the A square wave shown in FIG. 5a. The logic 1 output from gate NAND1 is coupled to said other input of gate NAND2 which also has logic 1 on said one input from the collector of transistor Q24. Gate NAND2 thus provides a logic 0 voltage on $\overline{A}$ output conductor which is also coupled to the said other input of gate NAND1, thereby latching gate NAND1 with logic 1 on its output and on the A output conductor.

When rotatable electrode 35 is opposite the pairs of stationary plates 31d, 31e, and 31f designated $\overline{A}$ so that the sum of the readout pulses from relaxation oscillator 10 coupled thereto is greater than the sum of the pulses coupled to the pairs of stationary plates 31a, 31b, and 31c designated A, transistor Q24 is turned on and transistor Q23 is turned off, thereby changing said one input to gate NAND1 to logic 1 and said one input to gate NAND2 to logic 0 and switching the NAND gate latch circuit LCA to the opposite state so that logic 1 voltage appears on the $\overline{A}$ lead (as shown at 60 in FIG. 5a) and logic 0 appears on the A output lead.

SYNCHRONOUS PULSE GENERATOR

Figure 5B:
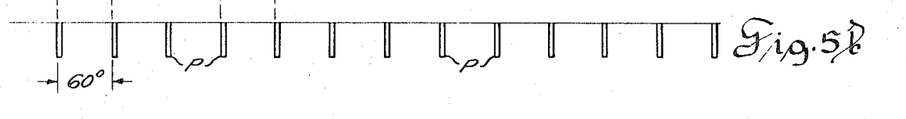

Synchronous pulse generator 14 receives the three-phase square waves $\overline{A}$, $\overline{B}$, and $\overline{C}$ and their complements A, B, and C from square wave generator 12 and generates a negative-going pulse P shown in FIG. 5b at every square wave edge of the output from square wave generator 12. Synchronous pulse generator 14 thus derives a train of pulses wherein each pulse P corresponds to a change of state of the latch circuits LCA, LCB and LCC. Inasmuch as there are six edges per cycle of the three-phase square waves A, $\overline{A}$, B, $\overline{B}$, C and $\overline{C}$, six pulses are derived by synchronous pulse generator 14 at a frequency proportional to motor speed for each cycle of the three-phase square wave output from square wave generator 12.

Synchronous pulse generator 14 includes a single-ended differential amplifier 70 of conventional design wherein the base of one transistor Q25 is coupled to the A, B and C leads from the latch circuits LCA, LCB, and LCC of the square wave generator 12 through individual differentiating capacitors C3. The base of the other transistor Q26 of differential amplifier 70 is coupled to the A, B, and C leads from square wave generator 12 through individual differentiating capacitors C4. The collectors of transistors Q25 and Q26 are commoned and connected to the output lead 75 in which the train of synchronizing pulses P shown in FIG. 5b appears. Each transistor Q25 and Q26 is preferably one half of an integrated circuit element similar to that sold by RCA Corporation under the type designation CA3026. The input capacitors C3 and C4 differentiate the square wave outputs A, B, C, $\overline{A}$, $\overline{B}$ and $\overline{C}$ from square wave generator 12, and the differential amplifier 70 is operated in an overdriven mode and shapes the pulses to form a single train of negative going pulses P at the commoned collectors, as shown in FIG. 5b at a frequency indicative of motor speed and with a pulse P generated at each change of state of the NAND gate latch circuits LCA, LCB, and LCC of the square wave generator 12, i.e., at every square wave edge of the output pulses A, $\overline{A}$, B, $\overline{B}$, C and $\overline{C}$. Pulses P may be delayed in a variable delay circuit which controls the duty cycle of power switches (not shown) that energize motor stator windings in the desired sequence as disclosed in the aforementioned copending application of Frederich A. Stich and Allois F. Geiersbach, Ser. No. 266,286.

The preferred embodiment has been described with adjacent first stationary plates together subtending 180 electrical degrees coupled to one input of each differential amplifier to derive a phase output signal (e.g., stationary plates 31a, 31b and 31c coupled to the A input of differential amplifier 61A) and adjacent second stationary plates together subtending 180 electrical degrees and displaced 180 electrical degrees from the first plates coupled to the other input of the differential amplifier to derive the phase signal complement, (e.g., second stationary plates 31d, 31e, and 31f displaced 180 electrical degrees from corresponding first plates 31a, 31b and 31c are coupled to the $\overline{A}$ input of differential amplifier 61A to derive signal $\overline{A}$), but in alternative embodiments only p times n stationary capacitor plates are provided to derive the phase output signal, e.g., A, and other means are utilized to generate its complement, i.e., $\overline{A}$, when the phase output signal, such as A, is absent.

It should be understood that I do not intend to be limited to the particular embodiment shown and described for many modifications and variations thereof will be readily apparent to those skilled in the art.

The embodiments of the invention in which an exclusive property or privilege is claimed are defined as follows:

1. A capacitive position sensor for indicating the position of a rotatable member comprising, in combination,
   a rotatable, radially elongated capacitor plate operatively connected to said member for rotation therewith,
   a plurality of stationary capacitor plates circumferentially displaced from each other in a plane adjacent to said rotatable plate and perpendicular to the axis thereof and each of which subtends a substantially greater arc about said axis of rotation than said rotatable plate,
   an oscillator adapted to generate high frequency pulses,
   means for coupling the output of said oscillator to said rotatable plate, and
   indicating means coupled to said stationary capacitor plates and responsive to the high frequency pulses from said oscillator passing through the capacitance between said rotatable plate and each said stationary plate as said rotatable plate revolves for generating an output pulse when said rotatable plate is opposite each stationary plate indicative of the instantaneous position of said rotatable member.

2. A capacitive position sensor in accordance with claim 1 wherein said indicating means includes a plurality of differential amplifiers each having its inputs coupled to a pair of stationary capacitor plates displaced 180 electrical degrees apart, whereby a logic one voltage signal is coupled to one of said inputs from the stationary plate of said pair opposite said rotatable plate at a given instant and a logic zero voltage signal is simultaneously coupled to the other input from the other stationary plate of said pair.

3. A capacitive position sensor in accordance with claim 2 wherein said indicating means includes a plurality of bistable circuit means each of which receives the output from one of said differential amplifiers for deriving square wave pulses indicative of the position of said rotatable member, said bistable circuit means providing positive feedback to the inputs of said differential amplifier to enhance discrimination between stationary capacitor plates.

4. A capacitive position sensor in accordance with claim 1 wherein said oscillator is adapted to generate fast-rise pulses and has a frequency substantially higher than the r.p.m. of said rotatable member.

5. A capacitive position sensor in accordance with claim 1 for generating an n-phase train of output pulses indicative of the position of said rotatable member and at a frequency proportional to the angular velocity of said rotatable member, where n is an integer, and wherein said indicating means includes n pulse amplifier means each of which is electrically coupled to a plurality of adjacent first stationary capacitor plates which together subtend 180 electrical degrees and are displaced 360/n electrical degrees from the first stationary plates coupled to the other pulse amplifier means.

6. A capacitive position sensor in accordance with claim 1 for generating an n-phase train of output pulses indicative of the position of said rotatable member and at a frequency which is a function of the angular velocity of said rotatable member, where n is an integer, and wherein said indicating means includes n differential amplifiers each of which has one of its inputs electrically coupled to a plurality of adjacent first stationary capacitor plates which together subtend 180 electrical degrees and its other input coupled to a plurality of adjacent second stationary capacitor plates which are displaced 180 electrical degrees from said first stationary plates, and wherein said first stationary capacitor plates coupled to said one input of each differential amplifier are displaced 360/n electrical degrees from the first stationary plates coupled to said one input of each of the other differential amplifiers.

7. A capacitive position sensor in accordance with claim 1 wherein said rotatable member is the rotor of an electric motor having n phases and p rotor pole pairs, where n and p are integers, and wherein said rotor position sensor includes at least n times p of said stationary capacitor plates and derives an n-phase train of output pulses indicative of the instantaneous position of said rotor having a frequency which is a function of the angular velocity of said rotor.

8. A capacitive rotor position sensor in accordance with claim 7 including n times 2p stationary capacitor plates and said indicating means includes n differential amplifiers each of which derives the output pulses for one of said phases and has its inputs coupled to stationary capacitor plates displaced 180 electrical degrees apart.

9. A capacitive rotor position sensor in accordance with claim 8 wherein a plurality of first stationary capacitor plates which together subtend 180 electrical degrees are electrically coupled to one input of each of said differential amplifiers and are displaced $360/n$ electrical degrees from the first stationary capacitor plates which are coupled to said one input of each of the other differential amplifiers, whereby each said differential amplifier derives output pulses of 180 electrical degrees duration for one phase displaced $360/n$ electrical degrees from the other phase output pulses.

10. A capacitive rotor position sensor in accordance with claim 9 wherein a plurality of second stationary capacitor plates which together subtend 180 electrical degrees are electrically coupled to the other input of each of said differential amplifiers and are displaced 180 electrical degrees from said first stationary plates which are coupled to said one input, and wherein each of said first and said second stationary plates subtend $360/2n$ electrical degrees, whereby a phase output pulse of 180 electrical degrees duration is generated when said rotatable plate is opposite said first stationary plates and its complement is generated when said rotatable plate is opposite said second stationary plates.

11. A capacitive rotor position sensor in accordance with claim 7 including $n$ times $2p$ stationary capacitor plates and said indicating means includes n pulse amplifier means each of which is associated with one phase of said motor and is electrically coupled to a plurality of first stationary capacitor plates each of which subtends $360/2n$ electrical degrees and which together subtend 180 electrical degrees and which are displaced $360/n$ electrical degrees from the first stationary plates coupled to each of the other pulse amplifying means.

12. A capacitive rotor position sensor in accordance with claim 9 wherein $p$ is equal to at least two and said rotatable plate has a radially elongated arm for each pole pair and said radially elongated arms are disposed 360 electrical degrees apart and also wherein stationary plates displaced 360 electrical degrees apart are associated with the same phase and are coupled to the same differential amplifier, whereby the signals from said stationary capacitor plates displaced 360 electrical degrees apart are additive.

13. A capacitive position sensor in accordance with claim 1 and including grounded conductor means extending radially between adjacent stationary capacitor plates for electrically isolating them from each other.

14. A capacitive position sensor in accordance with claim 1 and including a coupling capacitor having a stationary electrode disposed in said plane radially inward from said stationary capacitor plates, and a rotatable electrode spaced by an air gap in an axial direction from said stationary electrode and having a radially extending portion integral therewith opposite said stationary capacitor plates constituting said rotatable capacitor plate, said oscillator being coupled to said rotatable plate through said coupling capacitor.

15. A capacitive rotor position sensor in accordance with claim 10 and including grounded conductor means extending radially between adjacent stationary capacitor plates for electrically isolating them from each other.

16. A capacitive rotor position sensor in accordance with claim 10 and including a coupling capacitor having a stationary electrode disposed in said plane radially inward from said stationary capacitor plates and a rotatable electrode spaced by an air gap in an axial direction from said stationary electrode and having a narrow radially extending portion integral therewith constituting said rotatable capacitor plate, said oscillator being coupled to said rotatable capacitive plate through said coupling capacitor.

17. A capacitive rotor position sensor for generating an $n$-phase train of pulses indicative of the position of the rotor of an electric motor having $n$ phases and $p$ pairs of rotor poles and at a frequency proportional to the angular velocity of said rotor, where $n$ and $p$ are integers, comprising, in combination,
a rotatable, radially elongated capacitor plate operatively connected to said rotor for rotation therewith,
$2pn$ stationary capacitor plates each of which subtends an arc of approximately $360/2n$ electrical degrees disposed adjacent said rotatable plate in a plane perpendicular to the axis of rotation of said rotatable plate and being circumferentially displaced from each other in said plane,
a high frequency oscillator adapted to generate steep wavefront pulses electrically coupled to said rotatable plate, and
$n$ indicating means each associated with one phase of said motor and including a load impedance coupled to a plurality of adjacent first stationary capacitor plates for generating an output pulse in response to the high frequency pulses from said oscillator coupled through the capacitance between said rotatable and stationary plates when said rotatable plate is opposite each of said stationary plates as it revolves, the plurality of adjacent first stationary plates of each said indicating means coupled to said load impedance of one phase together subtending 180 electrical degrees and being displaced $360/n$ electrical degrees from the first stationary plates coupled to the load impedances associated with the other phases.

18. A capacitive rotor position sensor in accordance with claim 17 wherein each said indicating means includes a differential amplifier having one input coupled to said load impedance and to said first stationary plates of the associated phase and having its other input coupled to a plurality of adjacent second stationary plates which together subtend 180 electrical degrees and are displaced 180 electrical degrees from said first plates.

19. A capacitive rotor position sensor in accordance with claim 17 and including grounded conductor means extending radially between adjacent stationary plates for electrically isolating them from each other.

20. A capacitive rotor position sensor in accordance with claim 18 wherein each said indicating means also includes bistable circuit means coupled to the output of the associated differential amplifier for generating square wave pulses indicative of the position of said rotor, said bistable circuit means providing positive feedback to the inputs to the associated differential amplifier to enhance discrimination between stationary capacitor plates.

21. A capacitive rotor position sensor in accordance with claim 17 and including a coupling capacitor having a stationary electrode disposed in said plane radially inward from said stationary capacitor plates and a rotatable electrode spaced by an air gap in an axial direction from said stationary electrode and having a narrow radially extending portion integral therewith constituting said rotatable capacitor plate, said oscillator being coupled to said rotatable capacitive plate through said coupling capacitor.

22. A capacitor rotor position sensor in accordance with claim 17 wherein $p$ is equal to at least two and said rotatable capacitor plate has a radially elongated arm for each pole pair and said radially elongated arms are disposed 360 electrical degrees apart, and also wherein stationary capacitor plates displaced 360 electrical degrees apart are associated with the same phase and are coupled to the same differential amplifier, whereby the signals from said stationary plates displaced 360 electrical degrees apart are additive.

23. A capacitive rotor position sensor for generating a three-phase train of pulses indicative of the position of the rotor of an electric motor having three pairs of rotor poles comprising, in combination,
 a rotatable, diametrically elongated capacitor plate operatively connected to said rotor for rotation therewith,
 12 stationary capacitor plates circumferentially displaced from each other in a plane adjacent to said rotatable plate and perpendicular to the axis of rotation thereof, each of said stationary plates being in the shape of a sector of a ring and subtending an arc of approximately 30°,
 a high frequency oscillator coupled to said rotatable plate, and
 three differential amplifiers, one input of each of said differential amplifiers being coupled to three adjacent first stationary plates together subtending approximately 90° and to the three stationary plates diametrically opposed thereto, and the other input being coupled to three adjacent second stationary plates circumferentially displaced 90° from said first stationary plates and also to the stationary plates diametrically opposed to said second stationary plates, the corresponding inputs of said three differential amplifiers being coupled to stationary plates displaced 120° apart.

24. A capacitive rotor position sensor in accordance with claim 23 and including,
 a coupling capacitor having a stationary electrode disposed in said plane radially inward from said stationary capacitor plates and a rotatable electrode spaced in an axial direction by an air gap from said stationary electrode and having a pair of diametrically opposed, radially extending, narrow portions integral therewith positioned opposite said stationary capacitor plates and together constituting said rotatable capacitor plate, said oscillator being coupled to said rotatable capacitor plate by said coupling capacitor.

25. A capacitive rotor position sensor in accordance with claim 24 and including grounded conductor means extending radially between adjacent stationary plates and also between the inner periphery of said stationary plates and said coupling capacitor stationary electrode for electrically isolating said stationary capacitor plates from each other.

* * * * *